United States Patent
Asao

(10) Patent No.: US 7,827,672 B2
(45) Date of Patent: Nov. 9, 2010

(54) METHOD OF MANUFACTURE STATOR FOR AN AUTOMOTIVE ALTERNATOR

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/274,156

(22) Filed: Nov. 16, 2005

(65) Prior Publication Data

US 2006/0075627 A1    Apr. 13, 2006

Related U.S. Application Data

(62) Division of application No. 09/277,198, filed on Mar. 26, 1999, now abandoned.

(30) Foreign Application Priority Data

Oct. 28, 1998    (JP) .............................. 10-306842

(51) Int. Cl.
    *H02K 15/00* (2006.01)
(52) U.S. Cl. .............................. 29/596; 29/606; 29/609
(58) Field of Classification Search ........... 29/596–598, 29/605–606, 10; 310/42, 216–218, 254–259
    See application file for complete search history.

(56) References Cited

U.S. PATENT DOCUMENTS

| | | | | |
|---|---|---|---|---|
| 911,713 A | * | 2/1909 | Frankenfield | ................ 310/265 |
| 2,235,903 A | | 3/1941 | Schonfelder | |
| 3,531,672 A | | 12/1968 | King | |
| 3,629,925 A | * | 12/1971 | Brown et al. | ................... 29/736 |
| 3,827,141 A | | 8/1974 | Hallerback | |
| 4,115,915 A | * | 9/1978 | Godfrey | ....................... 29/596 |
| 4,176,444 A | * | 12/1979 | Walker | ......................... 29/596 |
| 4,267,719 A | * | 5/1981 | Walker | ......................... 72/122 |
| 4,462,152 A | * | 7/1984 | Okamoto et al. | ............... 29/598 |
| 4,598,223 A | | 7/1986 | Glennon et al. | |
| 4,613,780 A | * | 9/1986 | Fritzsche | ..................... 310/216 |
| 4,654,552 A | * | 3/1987 | Fritzsche | ..................... 310/216 |
| 4,829,206 A | * | 5/1989 | Honshima et al. | ........... 310/214 |
| 4,896,066 A | * | 1/1990 | Tomite | ........................ 310/214 |
| 5,359,249 A | * | 10/1994 | Tanaka | ........................ 310/216 |

(Continued)

FOREIGN PATENT DOCUMENTS

JP    58-103841    *    6/1983

(Continued)

*Primary Examiner*—Minh Trinh
(74) *Attorney, Agent, or Firm*—Sughrue Mion, PLLC

(57) ABSTRACT

In a stator for an automotive alternator, the inner circumferential surfaces of the bridge portions are placed in contact with the end surfaces of the stator core without any gaps so that the spatial ratio occupied by the clusters of stator windings belonging to the bridge portions in the coil ends of the stator coil is at high density. The method of manufacture comprises a step of manufacturing a parallelepiped laminated body having a plurality of slots by laminating a plurality of comb-shaped strips each having a band portion and a plurality of teeth, a step of inserting into the slots from the side of the openings of the slots a stator coil comprising bridge portions and axially parallel portions having current generating portions, a step of extending the ends of the teeth of the laminated body in the longitudinal direction of the laminated body, and a step of bending the laminated body to form a cylindrical shape.

8 Claims, 10 Drawing Sheets

U.S. PATENT DOCUMENTS

| | | |
|---|---|---|
| 5,502,341 A | 3/1996 | Sato |
| 5,691,590 A | 11/1997 | Kawai et al. |
| 6,137,201 A * | 10/2000 | Umeda et al. ............... 310/179 |
| 6,281,612 B1 * | 8/2001 | Asao et al. ................. 310/179 |
| 6,664,695 B2 * | 12/2003 | Asao et al. ................. 310/208 |
| 6,742,238 B2 * | 6/2004 | Lee ............................ 29/596 |

FOREIGN PATENT DOCUMENTS

| | | |
|---|---|---|
| JP | 62-201038 | 9/1987 |
| JP | 4-105537 | 4/1992 |
| JP | 9-103052 | 4/1997 |

\* cited by examiner

METHOD OF MANUFACTURE STATOR FOR AN AUTOMOTIVE ALTERNATOR

This is a divisional application of application Ser. No. 09/277,198 filed Mar. 26, 1999 now abandoned. The entire disclosure of the prior Ser. No. 09/277,198 is hereby incorporated by reference.

BACKGROUND OF THE INVENTION

1. Field of the Invention

The present invention relates to a stator for an automotive alternator and a method of manufacture therefor.

2. Description of the Related Art

FIG. 9 is a cross-section showing an example of a conventional automotive alternator.

In the figure, bearings 21, 22 are disposed in an aluminum front bracket 1 and an aluminum rear bracket 2, and a shaft 6 having a pulley 4 secured to one end thereof is supported by the bearings 21, 22 so as to be able to rotate freely. A rotor 7 comprising a rotor coil 13 composed of field windings and rotor cores 14 comprising a pair of Lundell-type field cores, is fitted over the shaft 6. Fans 5 are secured to both end surfaces of the rotor 7. Slip rings 9 for supplying an electric current to the rotor 7 are disposed at the other end of the shaft 6 from the pulley 4. A brush holder 11 the rear bracket 2 in a position facing the slip rings 9. A regulator 18 for adjusting the magnitude of the alternating current generated in a stator 80 held between the front bracket 1 and the rear bracket 2 is secured to the brush holder 11. A regulator heat sink 17 being a cooling plate for promoting the cooling of the regulator 18 is disposed on the regulator 18.

A rectifier 12 electrically connected to the stator 80 for converting the alternating current generated in the stator 80 to a direct current is secured to the rear bracket 2. A rectifier heat sink 15 being a cooling plate for promoting the cooling of the rectifier 12 is secured to the rectifier 12.

An electric current is passed through the rotor coil 13 generating a magnetic flux in the rotor 7, whereby magnetic poles are formed in the rotor cores 14. The stator 80 surrounding the rotor 7 comprises: a stator core 81; and a stator coil 82 comprising stator windings composed of copper wire wound around the stator core 81 in which an alternating current is generated by changes in the magnetic flux from the rotor coil 13 as the rotor 7 rotates.

In an automotive alternator constructed in this manner, a current is supplied from a battery (not shown) through the brushes 10 and the slip rings 9 to the rotor coil 13, generating a magnetic flux in the rotor 7. At the same time, since the pulley 4 is driven by the engine and the rotor 7 is rotated by the shaft 6, a rotating magnetic field is imparted to the stator coil 82 and electromotive force is generated in the stator coil 82. This alternating electromotive force is converted to a direct current by means of the rectifier 12, its magnitude is regulated by the regulator 18, and the battery is recharged.

The rotor coil 13, the stator coil 82, the rectifier 12, and the regulator 18 constantly generate heat. Openings are disposed in the front bracket 1 and in the rear bracket 2 to allow an air flow generated by the fans 5 disposed on the rotor 7 to pass through in order to allow the heat generated by power generation to escape. As indicated by the arrows in FIG. 9, cooling air sucked longitudinally from outside the front bracket 1 passes between the air intake ribs 23 and is deflected radially outwards by one of the fans 5. The cooling air cools the front bracket 1 side of coil end portions 82b of the stator coil 82 projecting from the stator core 81, passes between the air return ribs 24 and is discharged to the outside.

Cooling air sucked longitudinally from outside the rear bracket 2 passes between the air intake ribs 25, passes over the rectifier heat sink 15 or the regulator heat sink 17, is deflected radially outwards by the other fan 5, cools the coil end portions 82b on the rear bracket 2 side, passes between the air return ribs 26 of the rear bracket 2 and is discharged to the outside.

FIG. 10 is a perspective view of the stator 80 of the automotive alternator in FIG. 9. The stator 80 comprises a stator core 81 and a stator coil 82 comprising stator windings secured to the stator core 81, and the method of manufacture thereof will be explained using FIGS. 11 to 13.

As shown in FIG. 11, two strips 89 having protrusions and recesses are formed by punching a thin roll of sheet metal. Each of the strips 89 is wound up from one end into a spiral and each layer of the wound up strip 89 is secured by welding to form a cylindrical stator core 81 having a predetermined thickness as shown in FIG. 12. Slots 81a for inserting the stator coil 82 are formed in inner circumferential portions of the stator core 81.

The stator coil 82 is formed into a cylindrical shape by connecting three phases of stator windings as shown in FIG. 13 and is inserted into the slots 81a in the stator core 81.

FIG. 14 is a structural diagram of the stator 80 given in FIG. 9. In the figure, the stator coil 82 comprises: axially parallel portions 821a being those portions which are substantially parallel to the central axis of the stator coil 82; and bridge portions 821b being circumferential portions connecting the axially parallel portions 821a to each other within each of the three phases of windings. Furthermore, the axially parallel portions 821a comprise: current generating portions 821a1 being those portions disposed within the slots 81a and generating electric current; and projecting parallel portions 821a2 exposed beyond the end surfaces 81b of the slots 81a.

Consequently, the bridge portions 821b and the projecting parallel portions 821a2 of the axially parallel portions 821a are included in coil ends 82b of the stator coil 82 being the projecting portions exposed beyond the end surfaces 81b of the slots 81a of the stator core 81. The regions W occupied by the coil ends 82b are indicated by the dot-and-dash lines in FIG. 15.

A coil insertion device such as, for example, that described in the Japanese Patent No. 2513351, can be used to insert a stator coil 82 such as this so as to fit inside the slots 81a of the stator core 81. Using this coil insertion device to manufacture the stator 80 shown in FIG. 10, the coil ends at the ends of the stator coil 82 on the side to be inserted into the stator core 81 are bent radially inwards and the stator coil 82 is inserted from the inner circumferential side of the stator core 81 by moving the stator coil 82 in an axial direction by means of a jig. After inserting the stator coil 82 into the slots 81a of the stator core 81, the radially inward-bending coil ends are restored to their original shape.

Now, since an electric current will arise in the stator 80 only in the windings within the slots 81a facing the rotor core 14, the windings in the bridge portions 821b and the projecting parallel portions 821a2 are merely passages for the generated current.

However, when the above coil insertion device is used to insert the stator coil 82 into the slots 81a of the stator core 81, the portions of the stator coil 82 required for bending and the portions required for axial displacement by the jig, etc., are only required during the assembly of the stator 80 and do not contribute to the generation of the electric current in the completed stator 80.

For this reason, since there are excess portions of stator coil such as these in the completed stator 80 which are required only for the assembly of the stator 80, the coil resistance value is not small, which does not help to reduce copper loss due to heat generated by the stator coil 82 as a result of the current flowing through the stator coil 82. Consequently, since the portions of the stator coil 82 not contributing to the generation of electric current are numerous, improvements in the output and efficiency of the automotive alternator are hindered. Moreover, having excess portions of stator coil required only for the assembly of the stator 80 has also made stators 80 of such construction disadvantageous from the viewpoint of cost and weight.

Furthermore, the length of the coil ends 82b is sometimes extended in the axial direction to allow more cooling air expelled from the fans 5 to strike the coil ends 82b. However, in this case the stator coil is enlarged and the amount of heat generated rises with the resulting increase in coil resistance. Furthermore, because the gaps 82c between the wires in the bridge portions 821b of the stator coil 82 and between the bridge portions 821b and the end surfaces 81b of the stator core 81 are larger, heat conductivity between the wires in the bridge portions 821b of the stator coil 82 and between the coil ends 82b and the stator core 81 is not good. Still furthermore, because the cooling air is allowed to strike the coil ends 82b, wind resistance is increased and the amount of cooling air is reduced for the alternator as a whole, leading to reciprocal problems such as poor cooling performance, etc., in other heat generating portions such as the rectifier 12 and the regulator 18.

In addition, when the coil ends 82b are made long, they form raised arches having gaps 82c between the bridge portions 821b and the stator core 81, and since the rigidity of the stator is reduced thereby, the amplitude of vibrations generated by magnetic attraction during power generation increase and electromagnetic noise worsens.

Of these vibrations in the alternator, the component in the direction of the central axis of the stator core causes displacement of the stator coil 82 in the axial direction relative to the stator core 81. That is to say that the stator coil 82 is dislodged relative to the stator core 81 and the stator coil 82 interferes with the stator core 81, resulting in a risk of inferior pressure resistance, layer shorting where the coating on the wire is broken, and shorts, etc., in the stator coil 82.

On the other hand, the trend in recent years towards increasing output in automotive alternators has necessitated the insertion of stator coils into the slots at high density, and when a coil insertion device such as that described in the Japanese Patent No. 2513351 is used to assemble the stator 80, protruding portions 81f being circumferentially extending protrusions are disposed on the ends 81d of the teeth 81c forming the slots 81a, as shown in FIG. 10, so that each portion of the stator coil 82 is not dislodged once inserted into the slots 81a, and therefore the slot openings 81e being the circumferential gaps in the slots 81a for insertion of the stator coil 82 are narrow. Consequently, it is becoming increasingly difficult to insert the cylindrical stator coils 82 into the slots 81a. That is to say that, in such an insertion method, abrasion occurs between the stator core 81 and the windings of the stator coil 82 being moved in the axial direction as they are inserted into the slots 81a, particularly in the vicinity of the slots 81a, damaging the windings of the stator coil 82 and giving rise to inferior pressure resistance, layer shorting, etc.

In order to try to solve this problem, it is possible to minimize the damage to the stator coil 82 due to movement and insertion by the method of manufacture for a stator described in Japanese Patent Laid-Open No. HEI 9103252. However, in this method of manufacture for a stator wherein a stator core is manufactured by laminating rectangular parallelepiped strips of thin sheet metal, when the stator coils are inserted into the slots 81a of the stator core 81, the windings are damaged by the circumferentially protruding portions 81f on the ends 81d of the teeth 81c defining the slots 81a.

Furthermore, because a magnetic field passes between the stator coil 82 and the facing portions of the rotor core 14, it is also desirable from the viewpoint of power generation performance that the teeth 81c be such that the slot openings 81e are made as small as possible. In addition, depending on the shape of the teeth 81c noise problems may arise due to noise generated by the flow of air in the gaps between the rotating rotor core 14 and the many slot openings 81e. Consequently, the shape of the teeth 81c must be appropriately determined giving consideration to power generation performance, noise reduction, and preventing dislodgment of the stator coils. However, it is necessary to avoid the protruding portions 81f as the stator coil is being inserted into the slots 81a, further imposing restrictions on the shape of the protruding portions 81f.

SUMMARY OF THE INVENTION

The present invention aims to solve the above problems and an object of the present invention is to provide a stator for an automotive alternator being light-weight, superior in cost performance, efficient at power generation, and low in noise. Another object of the present invention is to provide a method of manufacture therefor.

In order to achieve the above object, according to one aspect of the present invention, there is provided a stator for an automotive alternator comprising:

a stator core having a plurality of slots; and a stator coil being a cluster of three phases of connected stator windings having:

axially parallel portions being those portions which are substantially parallel to the central axis of the stator coil comprising current generating portions being those portions disposed within the slots and generating electric current, and projecting portions projecting from the axial end surfaces of the slots; and bridge portions being circumferential portions connecting axially parallel portions to each other within each of the three phases of windings;

wherein the inner circumferential surfaces of the bridge portions are placed in contact with the end surfaces of the stator core without any gaps in the direction of the central axis of the stator core so that the spatial ratio occupied by the clusters of stator windings belonging to the bridge portions in coil ends being those portions of the stator coil exposed beyond the axial end surfaces of the slots is at high density. In the stator for an automotive alternator according to the present invention, the stator core may also comprise:

a plurality of comb-shaped strips each having a band portion; and a plurality of teeth disposed substantially parallel to each other extending perpendicularly relative to the longitudinal direction of the band portion, the plurality of strips being laminated and formed into a cylindrical shape, and the ends of the teeth being provided with circumferentially projecting portions. In the stator for an automotive alternator according to the present invention, the stator coil may also be a flat planar shape.

According to another aspect of the present invention, there is provided a method of manufacture for a stator for an automotive alternator comprising:

a step of manufacturing a parallelepiped laminated body having a plurality of slots by laminating a plurality of comb-shaped strips each having a band portion and a plurality of teeth disposed substantially parallel to each other extending perpendicularly relative to the band portion;

a step of inserting into the slots from the side of the openings of the slots a stator coil being a cluster of three phases of connected stator windings comprising:

axially parallel portions being those portions which are substantially parallel to the central axis of the stator coil having current generating portions being those portions disposed within the slots and generating electric current; and bridge portions being circumferential portions connecting axially parallel portions to each other within each of the three phases of windings;

a step of extending the ends of the teeth of the laminated body in the longitudinal direction of the laminated body; and a step of bending the laminated body to form a cylindrical shape.

The method of manufacture for a stator for an automotive alternator according to the present invention may also comprise a step of compression molding the bridge portions of the stator coil after the step of inserting the stator coil so that the inner circumferential surfaces of the bridge portions are placed in contact with the end surfaces of the stator core without any gaps in the direction of the central axis of the stator core.

In the method of manufacture for a stator for an automotive alternator according to the present invention, the strips may also be provided with grooves perpendicular to the longitudinal direction of the band portion on the ends of the teeth.

In the method of manufacture for a stator for an automotive alternator according to the present invention, the strips may also be provided with recessed portions on both sides of the teeth.

In the method of manufacture for a stator for an automotive alternator according to the present invention, the stator coil may also be formed into a flat planar shape.

DETAILED DESCRIPTION OF THE PREFERRED EMBODIMENT

Embodiment 1

Figure 1:
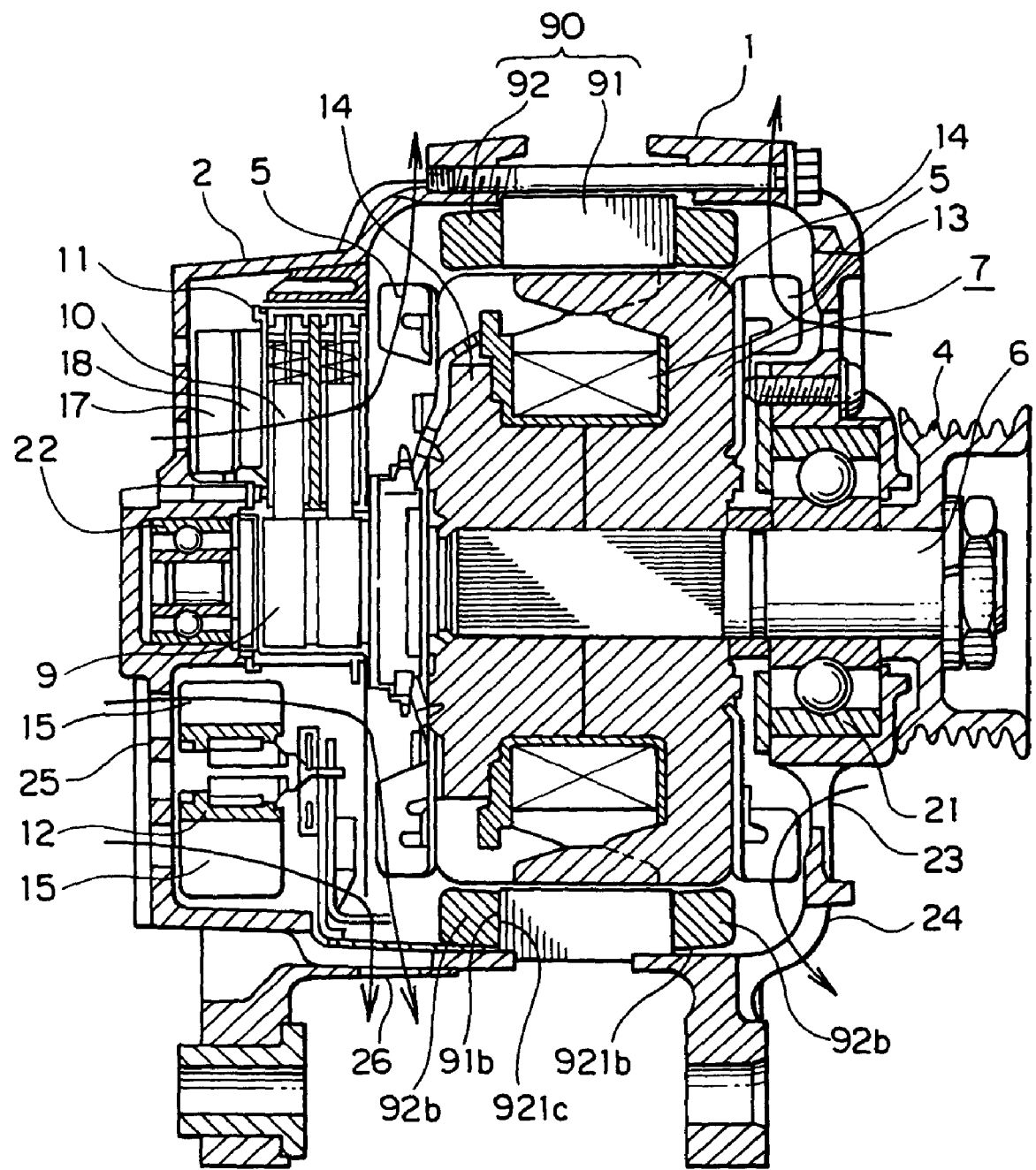
FIG. 1 is a cross-section of an automotive alternator according to Embodiment 1 of the present invention.
Figure 2:
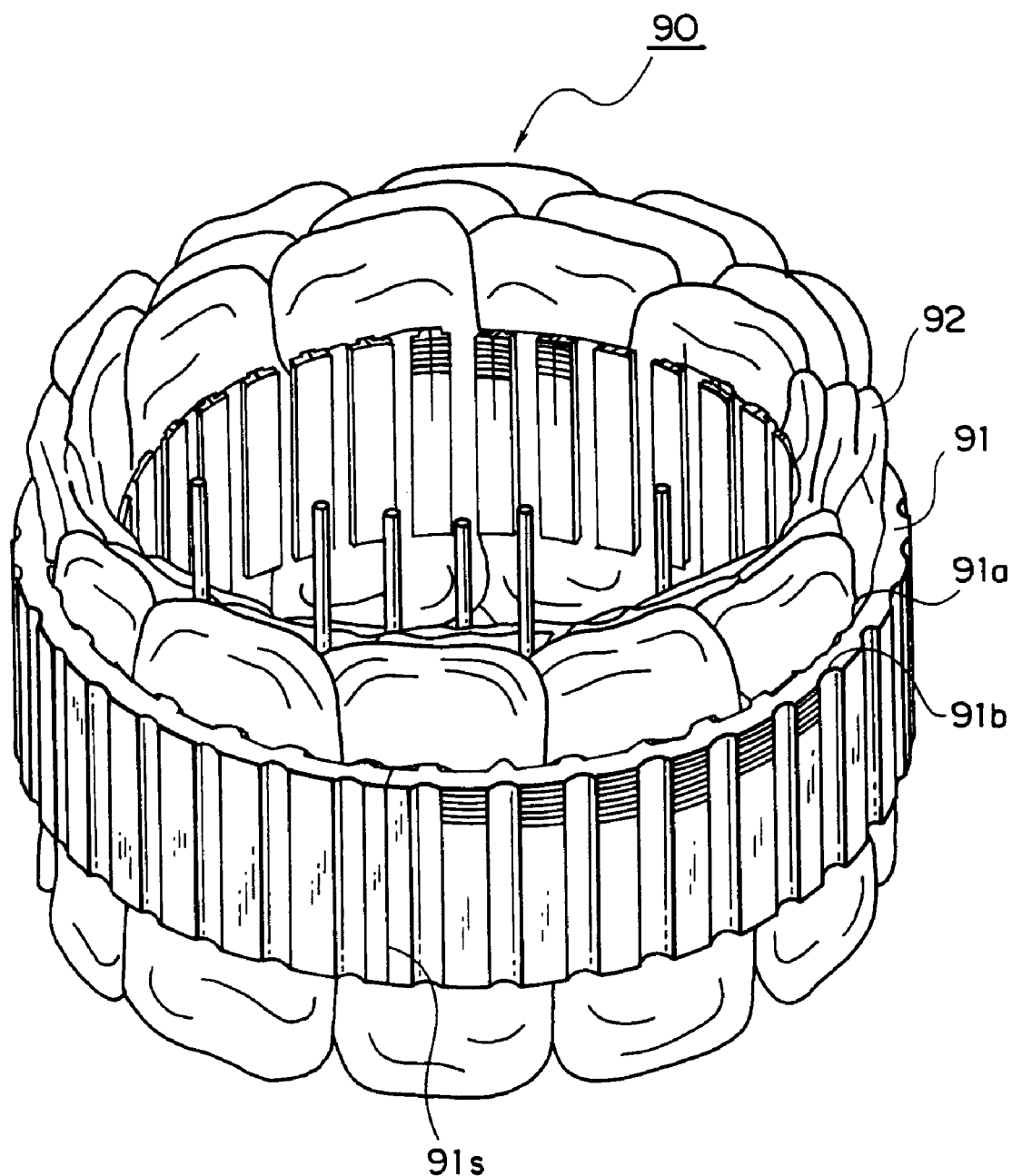
FIG. 2 is a perspective view of the stator of the automotive alternator according to Embodiment 1 of the present invention.
Figure 9:
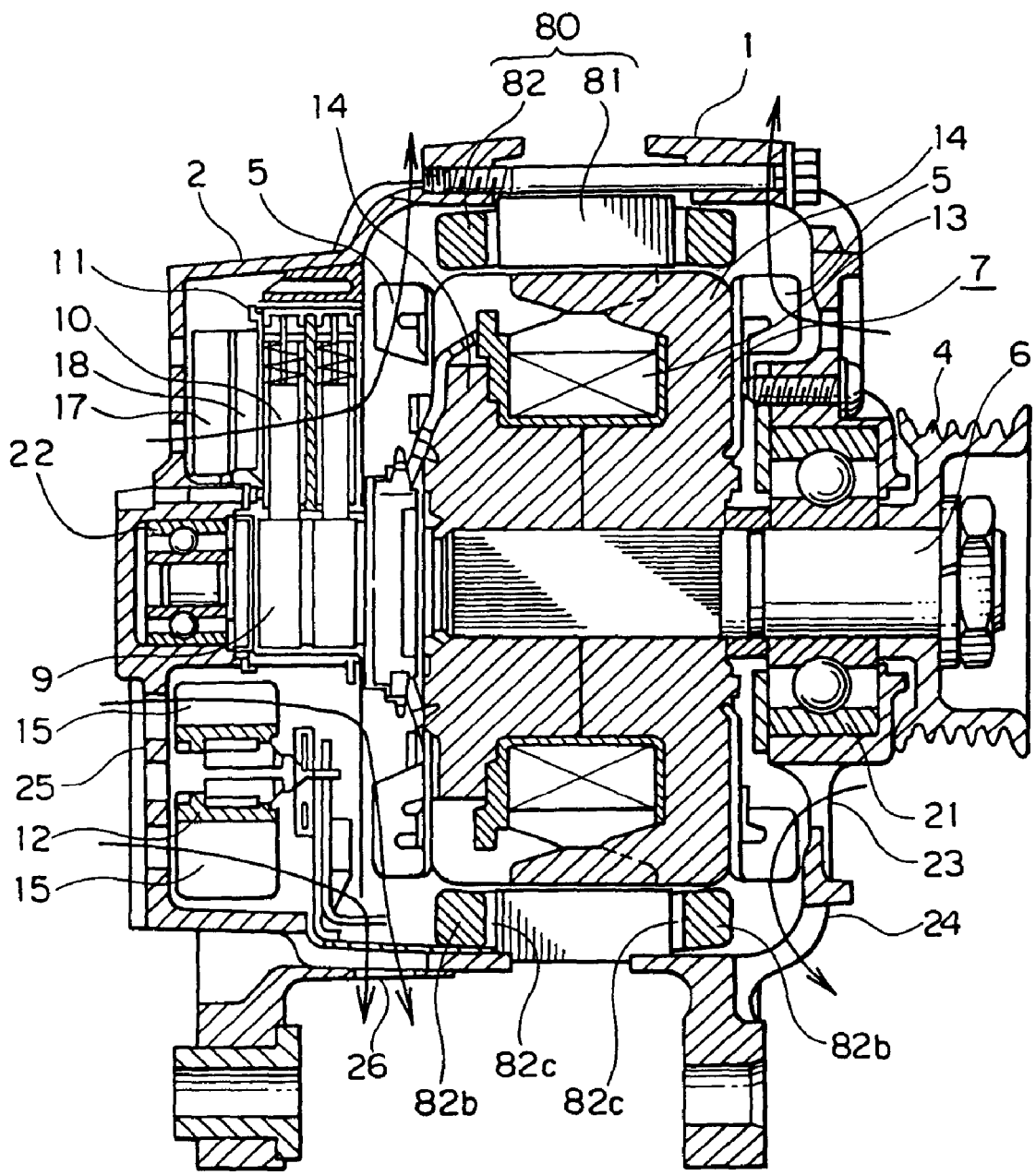
FIG. 9 is a cross-section of a conventional automotive alternator.
Figure 10:
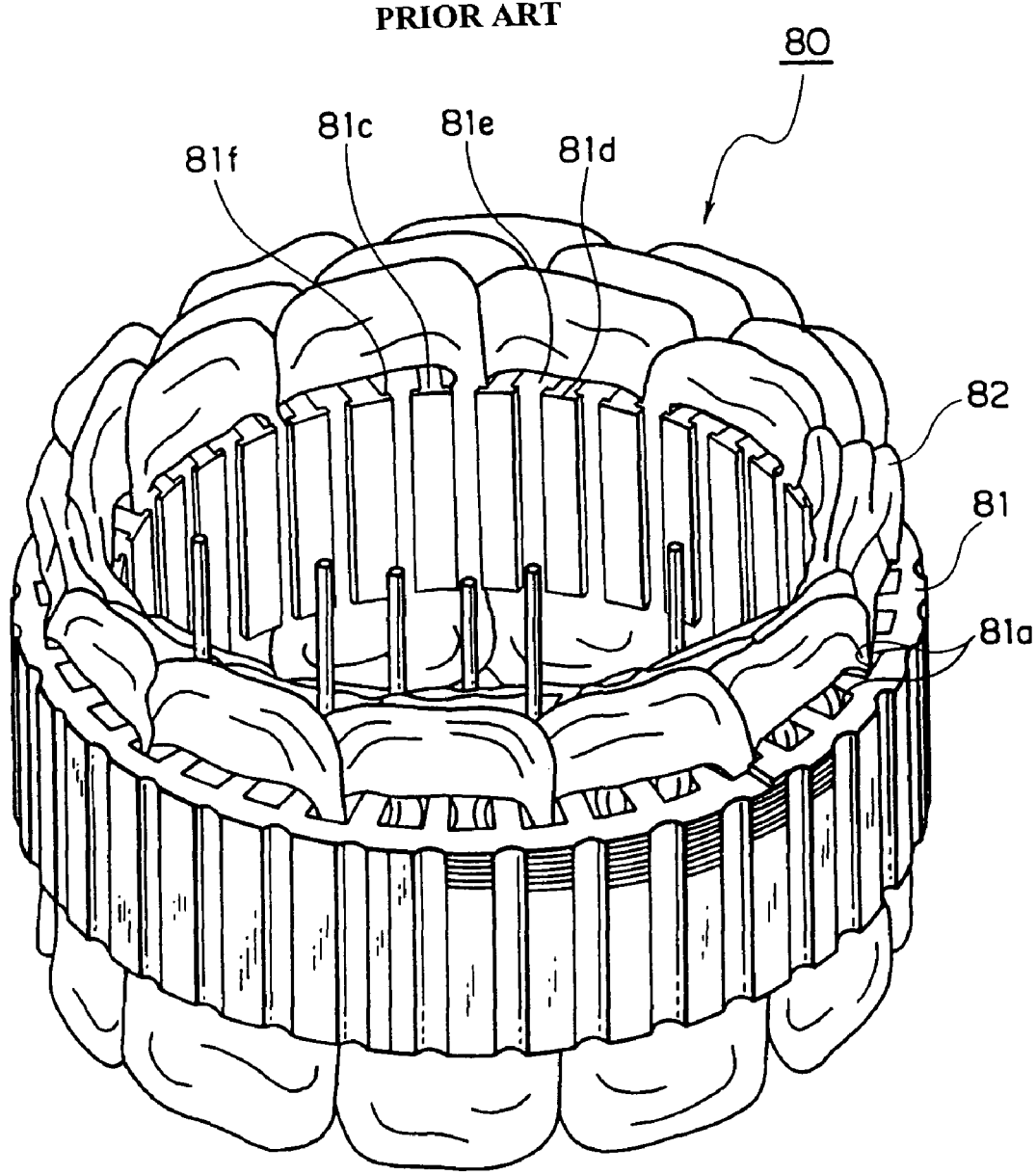
FIG. 10 is a perspective view of the stator for the conventional automotive alternator.
Figure 11:
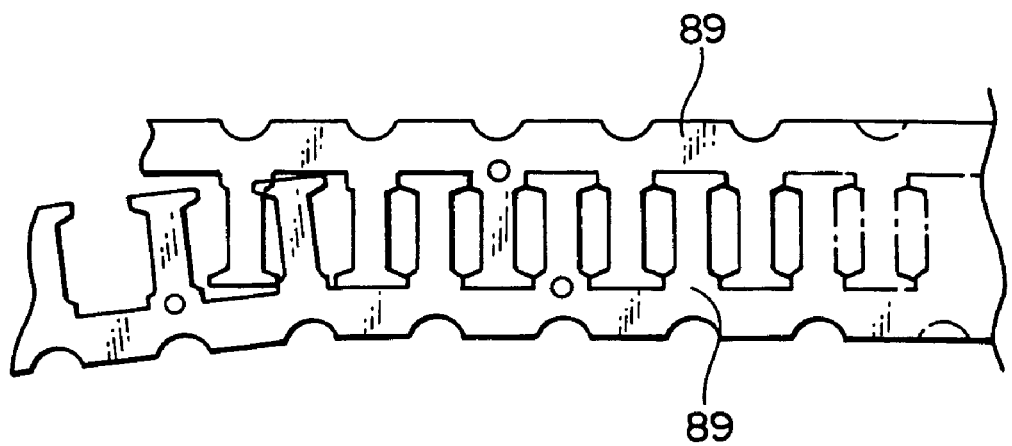
FIG. 11 is a process diagram showing the method of manufacture for the stator core of the conventional automotive alternator.
Figure 12:
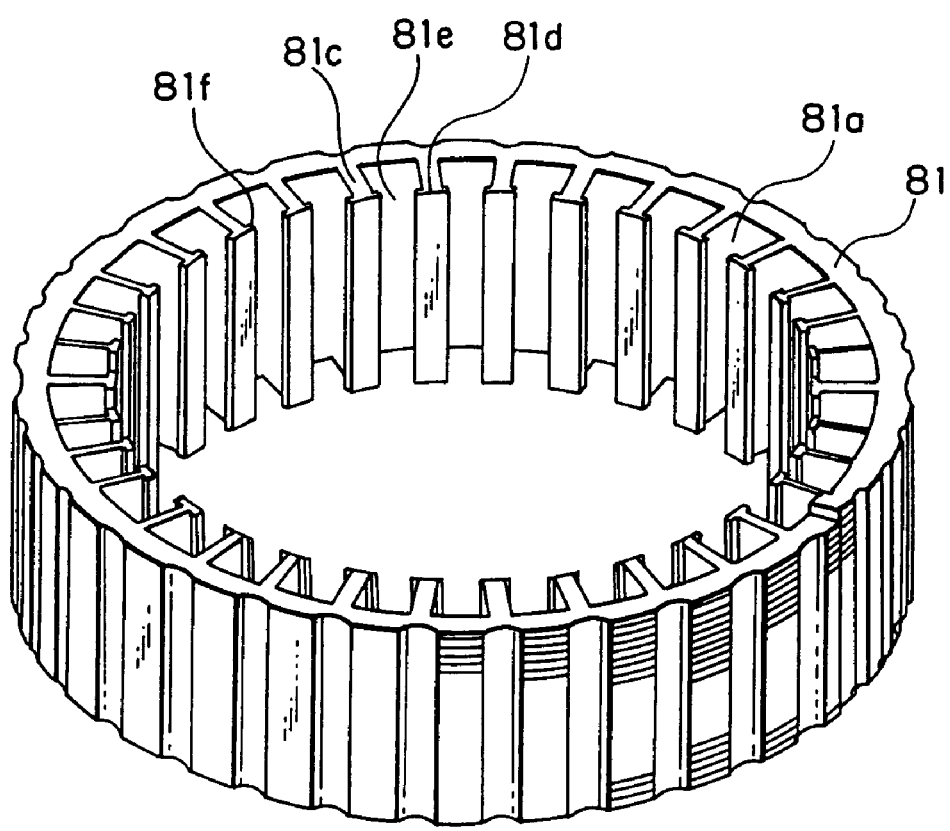
FIG. 12 is a perspective view of the stator core of the conventional automotive alternator.
Figure 13:
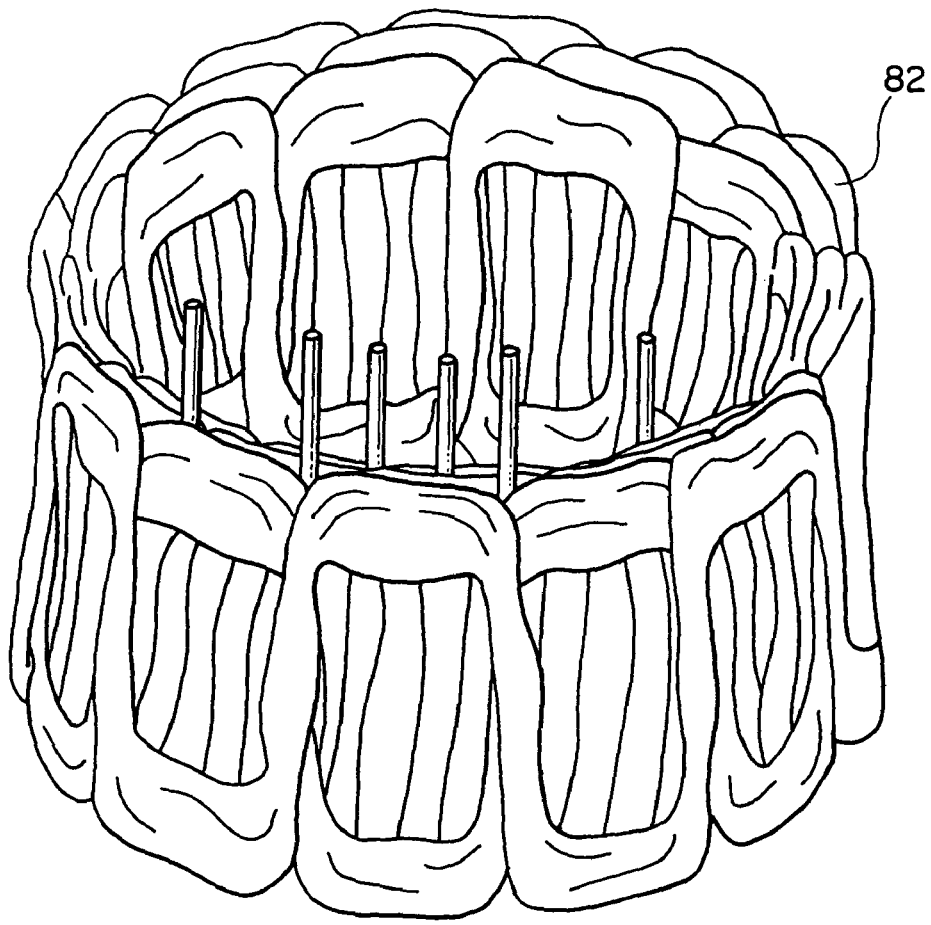
FIG. 13 is a perspective view of the stator coil of the conventional automotive alternator.
Figure 14:
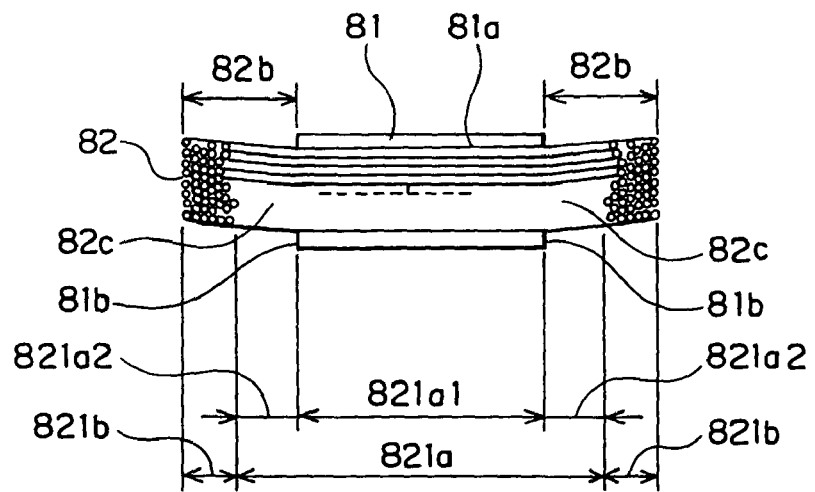
FIG. 14 is a structural diagram showing the construction of the stator of the conventional automotive alternator.
Figure 15:
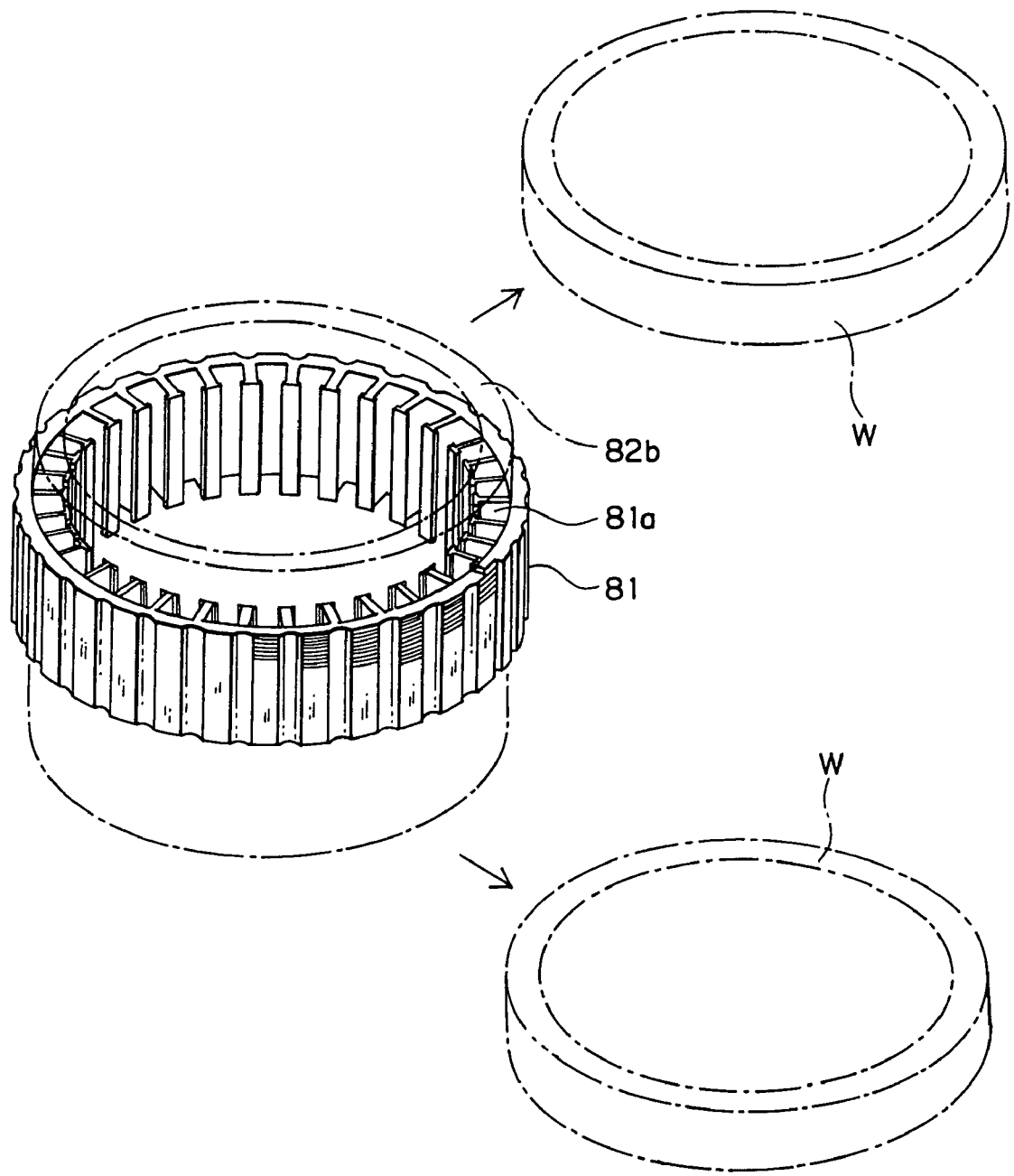
FIG. 15 is a perspective view showing the regions of the coil ends in the stator of the conventional automotive alternator.

FIG. 1 is a cross-section of an automotive alternator employing a stator 90 of an embodiment of the present invention. The construction of the stator 90 in FIG. 1 differs from that in FIG. 9, and FIG. 2 is a perspective view of the stator 90. In FIGS. 1 and 2, parts and portions which are identical or equivalent to those in FIGS. 9 and 10 will be given identical numbers and duplicate explanations will be omitted.

Figure 8:
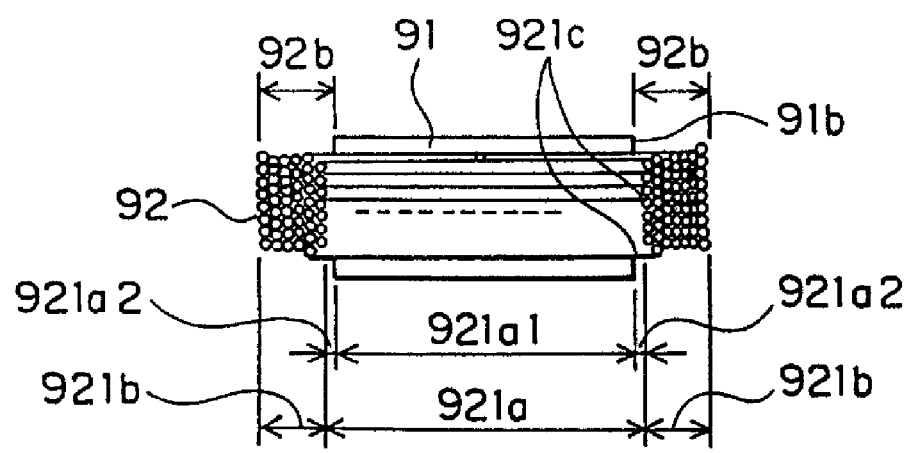
FIG. 8 is a structural diagram showing the construction of the stator of the automotive alternator according to Embodiment 1 of the present invention.

Furthermore, FIG. 8 is a structural diagram of the stator 90 shown in FIG. 2, and shows the construction of a stator coil 92 secured to a stator core 91. In the figure, the stator coil 92 comprises:

axially parallel portions 921a which are substantially parallel to the central axis of the stator coil 92; and bridge portions 921b being circumferential portions connecting the axially parallel portions 921a to each other within each of the three phases of windings. The axially parallel portions 921a comprise: current generating portions 921a1 being those portions disposed within the slots 91a and generating electric current; and projecting parallel portions 921a2 exposed beyond the end surfaces 91b of the slots 91a. The bridge portions 921b and the projecting parallel portions 921a2 of the axially parallel portions 921a are included in coil ends 92b of the stator coil 92 being the exposed projecting portions projecting from the stator core 91.

The stator 90 in FIG. 1 is similar to that in FIG. 9 in that it comprises a stator core 91 and a stator coil 92.

In the stator 90, the inner circumferential surfaces 921c of the bridge portions 921b are formed so as to be in contact with the end surfaces 91b of the stator core 91 without any gaps in the direction of the central axis of the stator core 91. Consequently, the stator coil 92 consists substantially of current generating portions 921a1 and bridge portions 921b only, with few or no projecting parallel portions 921a2. Furthermore, the spatial ratio occupied by the stator coil 92 in the clusters of stator windings belonging to the bridge portions 921b in the coil ends 92b is at high density.

In this example, the spatial ratio occupied by the stator coil 92 in the coil ends 92b is 90 percent or more, whereas the ratio was about 80 percent conventionally. Furthermore, since the coil ends 92b no longer form raised arches, the rigidity of the stator 90 is increased, reducing electromagnetic noise during power generation by suppressing electromagnetic vibrations due to magnetic attraction, and according to experiments, the resonant frequency is improved by ten percent, in particular with respect to vibrations in the direction of the central axis of the stator 90, the rate of vibration damping factor being improved twofold at that time. The electromagnetic noise level was also reduced by an average of 3 dB.

Next, the method of manufacture for the stator 90 being an embodiment of the present invention will be explained using FIG. 4 to 7.

Figure 4:
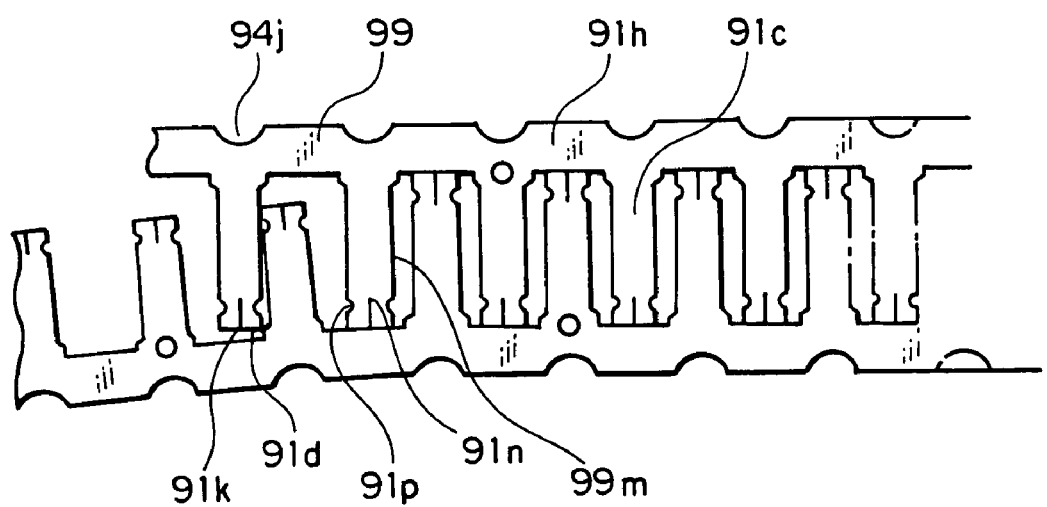
FIG. 4 is a process diagram showing the method of manufacture for the stator according to Embodiment 1 of the present invention.

Firstly, as shown in FIG. 4, two strips 99 having protrusions and recesses are formed by punching a thin roll of sheet metal. Each of the strips 99 is cut into predetermined lengths. The cut strips 99 form comb shapes each comprising a long slender band portion 91h extending longitudinally and a plurality of generally rectangular teeth 91c disposed substantially parallel to each other extending perpendicularly relative to the band portion 91h. A plurality of slots 91a are defined by pairs of adjacent teeth 91c and the portion of the band portion 91h located therebetween. Arc-shaped recess portions 91j are disposed in the band portion 91h at positions opposite the teeth 91c. Grooves 91k perpendicular to the longitudinal direction of the band portion 91h are disposed on the ends 91d of the teeth-91c. Arc-shaped recess portions 91p are disposed on both side surfaces 91m of each of the teeth 91c on both sides of the end 91n of the groove 91k.

A plurality of strips 99 formed in such a shape by punching are laminated to form a parallelepiped laminated body 95 having a plurality of slots 91a.

Figure 5:
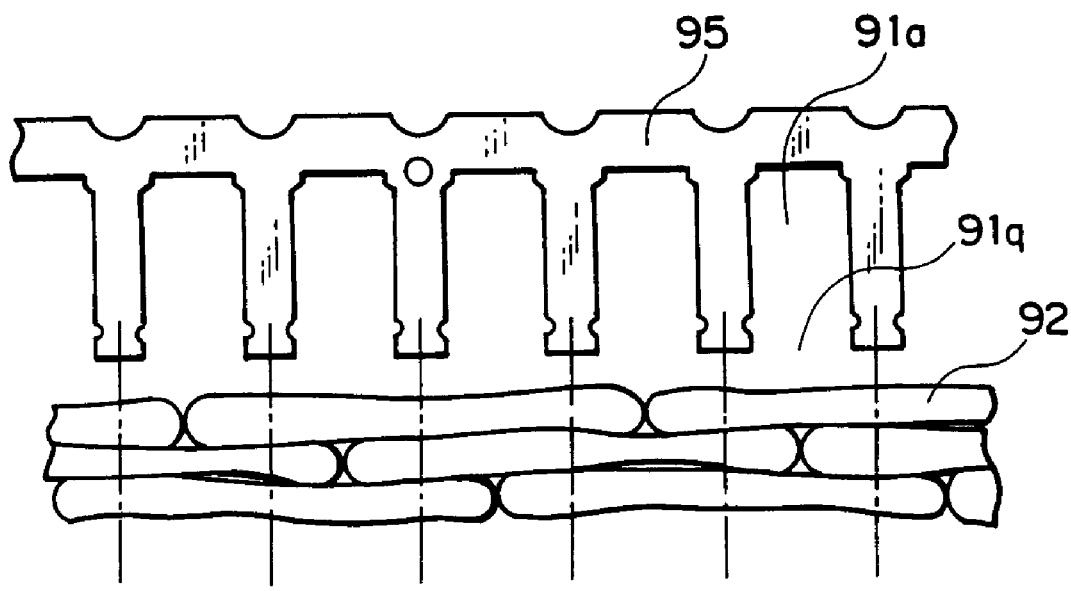
FIG. 5 is a process diagram showing the method of manufacture for the stator according to Embodiment 1 of the present invention.

FIG. 5 is a process diagram showing the state before the stator coil is inserted into the laminated body.

The stator coil 92 being a cluster of stator windings is preformed in a substantially flat planar shape so that it can be inserted into the slots 91a without modification. The bridge portions 921b of the stator coil 92 of this stator 90 are arranged such that the distance between the bridge portions 921b of the stator coil 92 is greater than but approximately equal to the distance between the end surfaces 91b of the stator core 91 so that the inner circumferential surfaces 92is of the bridge portions 921b are in contact with the end surfaces 91b of the stator core 91 without any gaps in the direction of the central axis of the stator core 91. Consequently, the stator coil 92 consists substantially of current generating portions 921a1 and bridge portions 921b only, with few or no projecting parallel portions 921a2.

Once the stator coil 92 is positioned opposite the laminated body 95, the stator coil 92 is inserted without modification into the slots 91a from the side of the openings 91q of the slots 91a without being moved in the axial direction.

Figure 6:
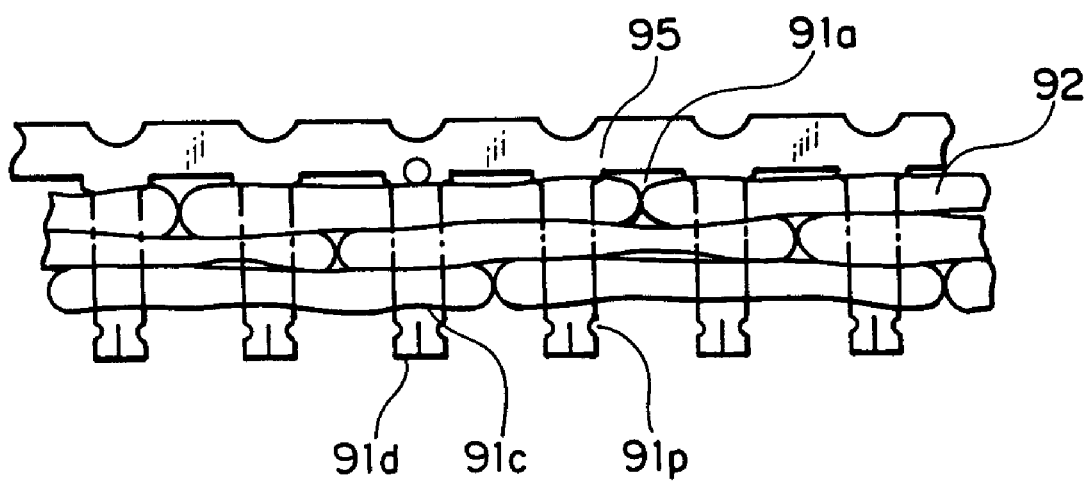
FIG. 6 is a process diagram showing the method of manufacture for the stator according to Embodiment 1 of the present invention.

FIG. 6 is a process diagram showing the state after the stator coil 92 is inserted into the slots 91a of the laminated body 95. Because the ends 91d of the teeth 91c of the laminated body 95 do not have projections projecting circumferentially, the stator coil 92 can be inserted into the slots 91a without being damaged.

When the stator coil 92 is inserted into the slots 91a, the ends 91d of the teeth 91c of the laminated body 95 are extended in the longitudinal direction of the laminated body 95 by a forming machine (not shown). At this time, the portion of the ends 91d beyond the grooves 91k disposed near the ends 91d are pushed and spread, forming projecting portions 91r extending in the longitudinal direction of the laminated body 95. Furthermore, when the projecting portions 91r are being formed, since the bending rigidity of the portion near the arc-shaped recessed portions 91p disposed on both side surfaces 91m of each of the teeth 91c on both sides of the end 91n of the groove 91k is weak, the ends 91d of the teeth 91c deform from this portion, facilitating spreading.

Figure 7:
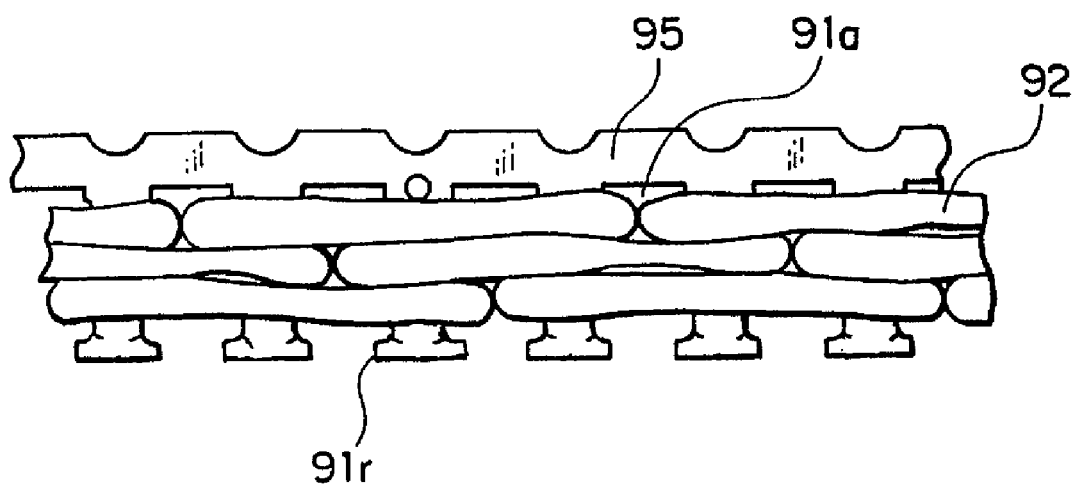
FIG. 7 is a process diagram showing the method of manufacture for the stator according to Embodiment 1 of the present invention.

FIG. 7 is a process diagram showing the state after the ends 91d of the teeth 91c are spread in the longitudinal direction of the laminated body 95.

Figure 3:
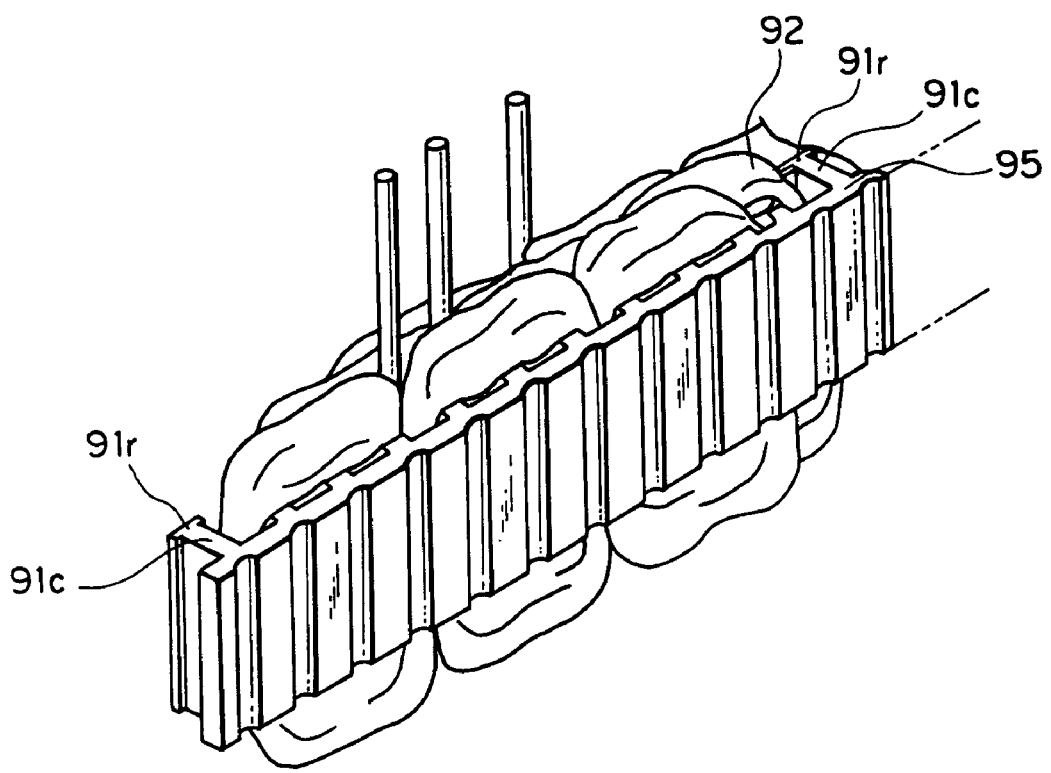
FIG. 3 is a perspective view of the laminated body into which the stator coil according to Embodiment 1 of the present invention is inserted.

FIG. 3 is a perspective view showing the stator coil 92 secured to the laminated body 95 by inserting the stator coil 92 into the laminated body 95 and forming the projecting portions 91r on the ends 91d of the teeth 91c, whereafter the laminated body 95 is bent into a cylindrical shape by a forming machine (not shown). Thereafter, both ends of the laminated body 95 are welded to each other, forming a welded portion 91s, as shown in FIG. 2, thus completing the rotor 90.

Moreover, as an example of a variation of this embodiment of the present invention, after the stator coil 92 is inserted into the slots 91a, a forming machine may be used to compression mold the bridge portions 921b of the stator coil 92 so as to be pressed against end surfaces 91b of the stator core 91. In this manner, the density of the spatial ratio occupied by the clusters of stator windings belonging to the bridge portions 921b in the coil ends 92b can be made even higher.

Furthermore, in order to make the bridge portions 921b of the stator coil 92 of the stator 90 so that the inner circumferential surfaces 921c of the bridge portions 921b are in contact with the end surfaces 91b of the stator core 91 without any gaps in the direction of the central axis of the stator core 91, the bridge portions 921b of the stator coil 92 may also be compression molded after the cylindrically preformed stator coil 92 is inserted into the cylindrical stator core 91 so as to be pressed against end surfaces 91b of the stator core 91 in the conventional manner.

According to one aspect of the present invention, there is provided a stator for an automotive alternator comprising: a stator core having a plurality of slots; and a stator coil being a cluster of three phases of connected stator windings having:

axially parallel portions being those portions which are substantially parallel to the central axis of the stator coil comprising current generating portions being those portions disposed within the slots and generating electric current, and projecting portions projecting from the axial end surfaces of the slots; and bridge portions being circumferential portions connecting axially parallel portions to each other within each of the three phases of windings;

wherein inner circumferential surfaces of the bridge portions are placed in contact with the end surfaces of the stator core without any gaps in the direction of the central axis of the stator core so that the spatial ratio occupied by the clusters of stator windings belonging to the bridge portions in coil ends being those portions of the stator coil exposed beyond the axial end surfaces of the slots is at high density, whereby the volume of the coil ends is reduced, enabling an inexpensive, compact, light-weight automotive alternator to be provided. Furthermore, since the coil ends do not contribute to the generation of electric current, by reducing the proportion of the volume that these portions occupy within the stator coil, stator coil copper loss can be reduced, leading to improved output and efficiency from the automotive alternator.

In addition, resistance by the coil ends to the cooling ventilation expelled by the fans is reduced and the amount of cooling ventilation is increased, enabling temperature increases in other heat generating portions to be suppressed and thus improving the cooling performance of the alternator as a whole. Furthermore, because the stator coil in the coil ends is in contact with the stator core without any gaps, thermal conductivity between the stator coil and the stator core is improved and temperature increases in the stator coil are suppressed.

Since the coil ends are not raised arches, the rigidity of the stator is increased, suppressing electromagnetic vibrations due to magnetic attraction during power generation and reducing electromagnetic noise. Furthermore, because the gaps between the stator coil in the coil ends and the stator core are eliminated, the stator coil will not be displaced relative to the stator core by vibrations in the alternator, improving the quality of the stator coil by preventing inferior pressure resistance and layer shorting.

In the stator for an automotive alternator according to the present invention, the stator core may also comprise a plurality of comb-shaped strips each having a band portion and a plurality of teeth disposed substantially parallel to each other extending perpendicularly relative to the longitudinal direction of the band portion, the plurality of strips being laminated and formed into a cylindrical shape, and the ends of the teeth being provided with circumferentially projecting portions, eliminating the need to provide excess portions which do not contribute to the generation of electric current between the stator coil and the stator core.

In the stator for an automotive alternator according to the present invention, the stator coil may also be a flat planar shape, increasing the spatial ratio occupied by the clusters of stator windings belonging to the bridge portions in the coil ends to a high density.

According to another aspect of the present invention, there is provided a method of manufacture for a stator for an automotive alternator comprising:

a step of manufacturing a parallelepiped laminated body having a plurality of slots by laminating a plurality of comb-shaped strips each having a band portion and a plurality of teeth disposed substantially parallel to each other extending perpendicularly relative to the band portion;

a step of inserting into the slots from the side of the openings of the slots a stator coil being a cluster of three phases of connected stator windings comprising:

axially parallel portions being those portions which are substantially parallel to the central axis of the stator coil having current generating portions being those portions disposed within the slots and generating electric current; and bridge portions being circumferential portions connecting axially parallel portions to each other within each of the three phases of windings;

a step of extending the ends of the teeth of the laminated body in the longitudinal direction of the laminated body; and a step of bending the laminated body to form a cylindrical shape, whereby portions which were necessary for assembly of the stator but did not contribute to the generation of electric current are no longer required, enabling an inexpensive, compact, light-weight automotive alternator to be provided. Furthermore, because the stator coil does not need to be moved in the axial direction when the stator coil is being inserted into the stator core, excessive force or bending is no longer applied to the stator coil, preventing damage to the windings of the stator coil. Because the stator coil is formed to meet the shape of the slots of the stator core and portions previously required only for assembly are no longer required, it is not necessary to provide a step of forming the ends of the stator coil after the insertion of the stator coil into the stator core. Furthermore, since it is not necessary to form the stator coil into a cylindrical shape, manufacture of the stator coil is facilitated, improving productivity.

The method of manufacture for a stator for an automotive alternator according to the present invention may also comprise a step of compression molding the bridge portions of the stator coil after the step of inserting the stator coil so that the inner circumferential surfaces of the bridge portions are placed in contact with the end surfaces of the stator core without any gaps in the direction of the central axis of the stator core, whereby the spatial ratio occupied by the clusters of stator windings belonging to the bridge portions in the coil ends is increased to an even higher density, the volume of the coil ends being reduced, enabling an inexpensive, compact, light-weight automotive alternator to be provided.

In the method of manufacture for a stator for an automotive alternator according to the present invention, the strips may also be provided with grooves perpendicular to the longitudinal direction of the band portion on the ends of the teeth, enabling the circumferentially projecting portions for securing the stator coil to the stator core to be formed easily after the insertion of the stator coil into the stator core. Furthermore, because projecting portions of any size can be formed simply by changing the depth of the grooves, a suitable shape for the projecting portions can be determined in consideration of power generation performance, noise reduction, and prevention of stator coil dislodgment.

In the method of manufacture for a stator for an automotive alternator according to the present invention, the strips may also be provided with recessed portions on both sides of the teeth, enabling the circumferentially projecting portions for securing the stator coil to the stator core to be formed even more easily after the insertion of the stator coil into the stator core.

In the method of manufacture for a stator for an automotive alternator according to the present invention, the stator coil may also be formed into a flat planar shape, increasing the spatial ratio occupied by the clusters of stator windings belonging to the bridge portions in the coil ends to a high density as well as facilitating insertion of the stator coil into the stator core.

What is claimed is:

1. A method of manufacture for a stator for an automotive alternator comprising:

manufacturing a parallelepiped laminated body having a plurality of slots by laminating a plurality of comb-shaped strips each having a band portion and a plurality of substantially rectangular teeth disposed substantially parallel to each other and extending perpendicularly relative to a longitudinal direction of said band portion, each tooth including an end portion having a slit, which is formed in a radial center of said end portion and is perpendicular to the longitudinal direction of said band portion;

inserting into said slots from a side of openings of said slots a stator coil being a cluster of three phases of connected stator windings comprising:

axially parallel portions being those portions which are substantially parallel to a central axis of said stator coil having current generating portions being those portions disposed within said slots and generating electric current; and bridge portions being circumferential portions connecting axially parallel portions to each other within each of said three phases of windings;

subsequent to the inserting, spreading said end portion of each of said teeth, from a corresponding slit, in a longitudinal direction of said laminated body, thereby newly forming pairs of projection portions from the end portions which are spread apart, the projection portions of each pair extending away from one another in the longitudinal direction of said laminated body; and bending said laminated body to form a cylindrical shape.

2. The method of manufacture for a stator for an automotive alternator according to claim 1 further comprising compression molding said bridge portions of said stator coil after said inserting said stator coil so that the inner circumferential surfaces of said bridge portions are placed in contact with the end surfaces of said stator core without any gaps in the direction of the central axis of said stator core.

3. The method of manufacture for a stator for an automotive alternator according to claim 2 wherein said strips are provided with recessed portions on both sides of said teeth.

4. The method of manufacture for a stator for an automotive alternator according to claim 3 wherein said stator coil is formed into a flat planar shape.

5. The method of manufacture for a stator for an automotive alternator according to claim 1 wherein said stator coil is formed into a flat planar shape.

6. The method of manufacture for a stator for an automotive alternator according to claim 1 wherein said strips are provided with recessed portions on both sides of said teeth.

7. The method of manufacture for a stator for an automotive alternator according to claim 6 wherein said stator coil is formed into a flat planar shape.

8. The method of manufacture for a stator for an automotive alternator according to claim 1, wherein each tooth includes recess portions disposed on side surfaces of a corresponding tooth and proximate to a slit end proximate the band portion, which recess portions facilitate the spreading and the forming.

* * * * *